Oct. 18, 1932.  C. CHRISTIANSEN  1,883,564
HARVESTER FRAME
Filed Aug. 14, 1931  2 Sheets-Sheet 1
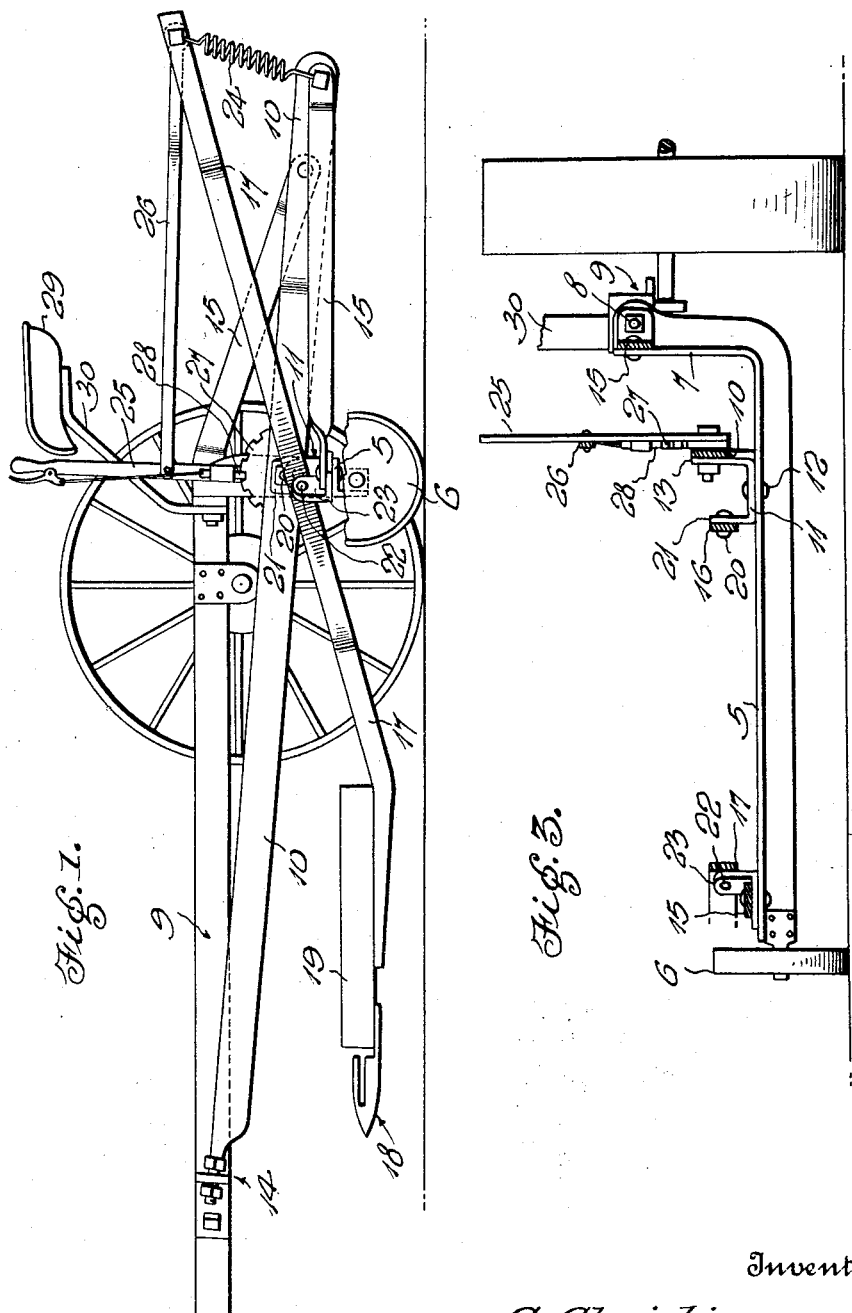
Inventor
C. Christiansen
Witness
H. Woodard

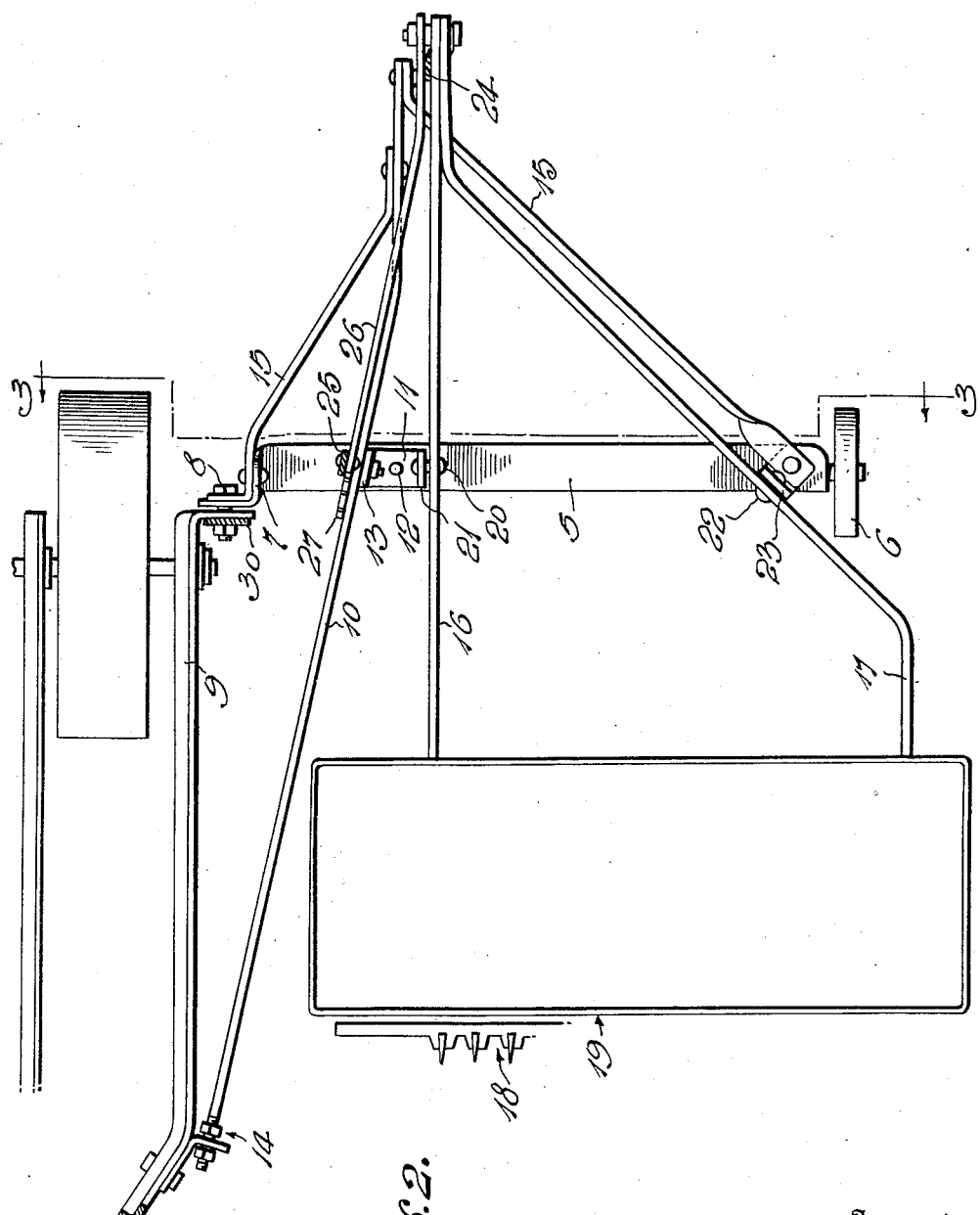

Patented Oct. 18, 1932

1,883,564

UNITED STATES PATENT OFFICE

CHRISTIAN CHRISTIANSEN, OF FARGO, NORTH DAKOTA

HARVESTER FRAME

Application filed August 14, 1931. Serial No. 557,176.

The invention aims to provide a new and improved frame structure for supporting the platform, sickle bar and other harvesting equipment of a harvesting machine, in such a manner that said equipment may be readily raised and lowered to cut at the desired elevation and to clear field obstructions. The frame herein disclosed is designed primarily for connection with a shock-forming machine abreast of the harvester, but certain features of the invention may be used even if the harvester operates entirely independently of a shocker.

Fig. 1 of the accompanying drawings is a side elevation partly broken away showing a harvester frame constructed in accordance with the invention and connected with the wheeled frame of a shocker.

Fig. 2 is a top plan view of the parts shown in Fig. 1, partly in horizontal section.

Fig. 3 is a transverse sectional view substantially on line 3—3 of Fig. 2.

One specific form of construction has been illustrated in the drawings and will be herein described, with the understanding however, that within the scope of the invention as claimed variations may be made.

The main frame of the harvester embodies an axle 5 transverse to the line of movement, said axle having a ground wheel 6 at one end and having its other end 7 turned upwardly, said end 7 being adapted for connection by means of a pivot bolt or the like 8, with the frame 9 of a wheeled shock-forming machine disposed abreast of the harvester. A longitudinal bar 10 extends across the axle 5 near its upturned end 7 and projects both forwardly and rearwardly from said axle. In the present showing, a U-shaped bracket 11 is rigidly secured at 12 upon the axle 5, and the bar 10 is secured to one of the arms 13 of said bracket. The front end of the bar 10 is provided with any preferred means 14 for pivotally connecting it with the frame 9. The pivotal axis of the connection 14 and that of the connection 8 are not shown in alinement with each other but one or the other is sufficiently loose to permit upward and downward relative swinging of the harvester and shocker frames, regardless of the misalinement of pivots. The rear end of the bar 10 is secured to forwardly diverging braces 15 whose front ends are suitably secured to the axle 5. In the present showing, one of the braces 15 is secured to the upturned axle end 7 and the other is secured upon the wheeled end of said axle.

A cutter-carrying frame, formed by two forwardly diverging bars 16 and 17, crosses the axle 5 between the wheel 6 and the bar 10, the front end of said frame carrying the sickle bar 18, platform 19 and other necessary harvesting equipment. Bar 16 is pivoted between its ends at 20 to one of the arms 21 of the bracket 11, and the bar 17 is pivoted at 22 to an appropriate bracket 23 secured to the wheeled end of the axle 5. The pivots 20 and 22 are transverse to the line of movement of the machine and hence allow such tilting of the cutter-carrying frame as to raise or lower the harvesting means to either cut at the desired elevation or to clear field obstructions. The pivots 20 and 22 are shown out of alinement, but here again sufficient looseness of parts exists to allow the necessary tilting movement of the frame 16—17. The rear end of this frame is connected by spring means 24 with the rear end of the bar 10, said spring means 24 being sufficient to substantially balance the weight of the harvesting equipment carried by the front end of the frame. Hence, the cutter-carrying frame may be readily tilted manually. To accomplish such tilting, I provide an upstanding hand lever 25 which is fulcrumed to the bar 10 or otherwise mounted upon the axle 5, said lever being connected by a rearwardly extending link 26 with the rear end of the frame 16—17. An appropriate quadrant 27 and dog 28 are employed to lock lever 25 so that the frame 16—17 may be held in any position to which it is tilted. The lever 25 is of course located near a driver's seat 29 whose supporting spring is shown at 30.

It will be seen from the foregoing that the invention is simple and inexpensive, yet that it will be efficient and very desirable to not only effectively support the harvesting means, but to allow vertical shifting of it to any required position.

I claim:—

1. In a harvester, a main frame, a cutter-carrying frame whose front end carries harvesting equipment, means between the front and rear ends of said cutter-carrying frame mounting the latter on said main frame on axes transverse to the line of travel of the machine, spring means connecting the rear end of said cutter-carrying frame with said main frame and substantially balancing the weight of the equipment carried by the front end of said cutter-carrying frame, allowing the latter to be readily tilted, and means for holding said cutter-carrying frame in any position to which tilted.

2. In a harvester, an axle and means for holding it against forward and rearward tilting, a frame member rigid with and projecting rearwardly from said axle, a frame whose front end carries harvesting equipment, said frame extending both forwardly and rearwardly from said axle and being pivoted to the latter on axes transverse to the line of travel of the machine, spring means connecting the rear end of said frame with said frame member and adapted to substantially balance the weight of the equipment carried by the front end of the frame, allowing said frame to be readily tilted, and means for holding said frame in any position to which tilted.

3. In a harvester, an axle having a ground wheel at one end and means at its other end for connecting it with an extraneous machine abreast the harvester, a longitudinal bar rigid with said axle and extending both forwardly and rearwardly from said other end thereof, the front end of said bar having means for connecting it with said extraneous machine, a frame whose front end carries harvesting equipment, said frame extending both forwardly and rearwardly from said axle between the wheeled end of the latter and said bar, means pivoting said frame to said axle on axes transverse to the line of travel of the machine, spring means connecting the rear end of said frame with the rear end of said bar, said spring means substantially balancing the weight of the equipment carried by the front end of said frame, allowing the latter to be readily tilted, and means for holding said frame in any position to which tilted.

4. In a harvester, an axle having a ground wheel at one end and means at its other end for connecting it with an extraneous machine abreast the harvester, a longitudinal bar rigid with said axle and extending both forwardly and rearwardly from said other end thereof, the front end of said bar having means for connecting it with said extraneous machine, a frame whose front end carries harvesting equipment, said frame extending both forwardly and rearwardly from said axle between the wheeled end of the latter and said bar, means pivoting said frame to said axle on axes transverse to the line of travel of the machine, spring means connecting the rear end of said frame with the rear end of said bar, said spring means substantially balancing the weight of the equipment carried by the front end of said frame, allowing the latter to be readily tilted, an upstanding forwardly and rearwardly swingable hand lever fulcrumed on said axle, a link connecting said lever with the rear end of said frame, whereby operation of said lever will tilt the frame, and means for holding said frame in any position to which tilted.

In testimony whereof I affix my signature.

CHRISTIAN CHRISTIANSEN.